May 10, 1955     R. L. DOERRFELD     2,708,216
TRANSMITTER SUPPRESSOR

Filed Sept. 13, 1952     2 Sheets-Sheet 1

INVENTOR
ROBERT L. DOERRFELD
BY Emery Robinson
ATTORNEY

INVENTOR
ROBERT L. DOERRFELD
BY Emery Robinson
ATTORNEY

United States Patent Office 2,708,216
Patented May 10, 1955

2,708,216

TRANSMITTER SUPPRESSOR

Robert L. Doerrfeld, Chicago, Ill., assignor to Teletype Corporation, Chicago, Ill., a corporation of Delaware Application September 13, 1952, Serial No. 309,540

11 Claims. (Cl. 178—17)

This invention relates to transmitter suppressors and more particularly to a tape controlled transmitter having a device for sensing permutative apertures in the tape to accordingly control the generation of signals by the transmitter and an auxiliary device for sensing the permutative apertures to suppress the generation of signals upon sensing a predetermined permutation of apertures in the tape or upon sensing a predetermined sequence of permutative apertures in the tape.

Errors are often made in the preparation of message tape for use in telegraph transmitters, or subsequent to the preparation of the tape, it becomes desirous to delete portions of the message. These errors or deletions are eliminated by superimposing over the permutative indicia or apertures a series of indicia or apertures equal in number to the maximum number of code elements in the particular code utilized. The net result of this operation is that the message tape has a series of transverse indicia or apertures for all code elements comprising a particular signal which may be considered as a signal representative of a rub-out or erasure. When this series of apertures is sensed by standard tape sensing equipment the invariable result is to cause the operation of an associated transmitter to transmit a signal representative of the deletion or cancellation. The reception of such a signal by standard receiving equipment causes the operation of such receiving equipment and if the receiving equipment is a reperforator then a message tape is prepared having the rub-out signals formed therein. Obviously the transmission and reception of such rub-out signals is a useless operation of the equipment. In the operation of certain types of equipment, such as line casting apparatus, in accordance with a permutatively apertured tape it is desirable to eliminate the surplus rub-out signals in order to prevent useless feeding of tape through the equipment.

It is a cardinal object of this invention to suppress the transmission of certain predetermined signals by a tape controlled transmitter.

It is a further object of the invention to sense tape and control the operation of a transmitter in accordance with certain predetermined indicia formed in or on a tape.

Another object of the present invention is the provision of an auxiliary sensing device for presensing indicia in a tape prior to the sensing operation performed by a standard tape sensing device and to control the operation of a transmitter in accordance with the actuation of the auxiliary sensing device.

An additional and more finite object of the invention resides in the provision of means for shunting a transmission line upon the sensing of a predetermined permutation of apertures in a message tape.

With these and other objects in view the present invention contemplates the use of a standard rotary type transmitter of the general type shown in Teletype Bulletin No. 141, Issue 3, issued March 1942 by the Teletype Corporation of Chicago, Illinois. As described in that bulletin, the transmitter comprises a commutator ring, a plurality of segments circumferentially spaced from the commutator ring, and a continually rotating brush adapted to successively span the segments of the distributor. Connected to the commutator ring is a signaling line whereas each segment is individually connected to a contact controlled by an individual tape sensing lever. The sensing levers are adapted to sense permutations of apertures formed in a tape and upon ascertainment of an aperture in the tape the sensing lever closes the associated contact to complete a circuit to the respective segment. Upon the brush spanning the respective segments and the commutator ring, a permutative series of impulses are impressed over the signaling line which are representative of the permutations of apertures formed in the tape.

More specifically the present invention combines with the afore-described transmitter, an auxiliary tape sensing device adapted to sense each set of permutative apertures prior to their presentation to the main sensing levers. Whenever a predetermined permutation of apertures is ascertained in the tape by the auxiliary sensing device, a circuit is thereby completed for the purpose of shunting the signaling line with respect to the commutator.

The present invention is described as being applied to a system utilizing a six unit code having a start impulse preceding and a stop impulse following each of the six code elements. It thus becomes apparent that to suppress the transmission of any signal all that is necessary is that any start impulse be suppressed and consequently a further object of this invention is to provide means for suppressing the transmission of any start impulse upon the auxiliary sensing device ascertaining a predetermined permutation of apertures in the message tape.

Other objects and advantages of the present invention will be apparent from the following detailed description when considered in conjunction with the accompanying disclosure wherein.

Figure 1:
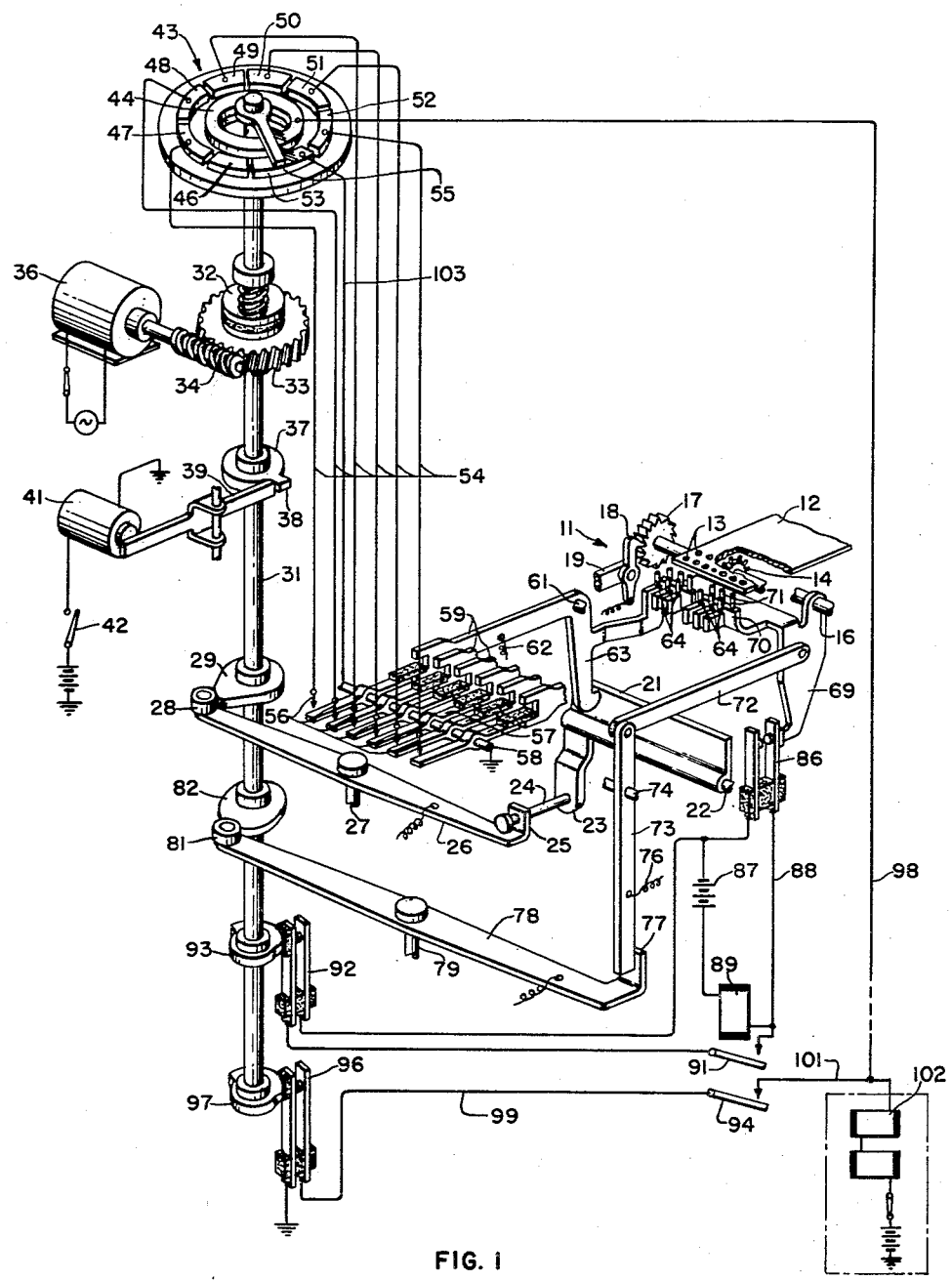
Fig. 1 is a schematic arrangement illustrating a transmitting station having included therein an auxiliary sensing device embodying the principal features of the invention.

Having reference to Fig. 1, a tape sensing unit is generally designated by the reference numeral 11 and is adapted to receive a message tape 12 from any well known apparatus for preparing the tape. The tape sensing unit and the transmitting unit are only described to an extent necessary to comprehend the present invention since many other tape sensing and transmitting units may be used in conjunction with the present invention. For a more detailed description of the tape sensing and transmitting unit, the reader's attention is directed to the aforeidentified Teletype Bulletin No. 141.

The tape 12 has formed therein by the perforating apparatus transverse sets of permutative apertures 13 which may in certain instances be six in number. The tape is further provided with feed holes longitudinally spaced therein. The tape is fed through the sensing apparatus by a feed wheel 14 mounted on a shaft 16. Secured to the shaft 16 is a ratchet 17 adapted to be actuated by a spring biased pawl 18 pivotally mounted on a feed lever 19. The feed lever 19 is oscillated to advance the pawl over the teeth of the ratchet 17 by a bail 21 pivotally mounted on a rod 22. Downwardly extending from the bail 21 is an arm 23 adapted to be engaged by an adjustable screw 24 which in turn is threadably mounted within an upturned end 25 of a follower 26. The follower 26 is pivotally mounted on a pin 27 and has rotatably mounted on its opposite end a roller 28 adapted to follow the periphery of the cam 29. Cam 29 is fixed to and adapted to rotate with a shaft 31.

The shaft 31 has mounted thereon a friction clutch 32 adapted to interconnect the shaft with a spur gear 33. The spur gear 33 is engaged by worm 34 continually rotated by any suitable electric motor 36. Secured to the shaft 31 is a disc 37 having extending therefrom a stop lug 38 adapted to cooperate with a stop lever 39. Controlling the position of the stop lever 39 is an electromagnet 41 adapted to be energized through a suitable circuit including a switch 42. Closure of the switch 42 completes the circuit for energizing the electromagnet 41 to withdraw the stop lever 39 from engagement with the lug 38 to permit power to be transmitted from the motor 36, through the worm 34, through the spur gear 33, through the clutch 32 to the shaft 31.

A transmitting unit generally designated by the reference number 43 comprises a commutator ring 44 and eight circumferentially spaced conductive segments 46 to 53, inclusive. The segments 47 to 52, inclusive, are connected through leads 54 to contacts 56. Secured to the shaft 31 is a brush 55 adapted to span the commutator ring 44 and the segments 46 to 53 during each rotation of the shaft 31. Associated with each contact 56 is a contact arm 57 individually mounted in a pivoted fashion about a conductor rod 58. The positions assumed by the contact arms 57 are controlled by means of sensing levers 59 individually mounted in a pivoted fashion about a shaft 61. The sensing levers 59 are bifurcated at their trailing ends for the reception of the free ends of the contact arms 57. Each sensing lever 59 is urged by a spring 62 to move in a counterclockwise direction about the shaft 61, however, such movement is prevented by an extension 63 formed integral with each sensing lever which is adapted to be engaged and held in position by the bail 21. In addition each sensing lever is provided with a sensing pin 64 adapted to probe and ascertain if any apertures 13 are positioned in alignment with the pins.

Turning now to a consideration of the elements comprising the present invention, there is provided a frame 69 which is pivotally mounted about the shaft 16. A portion of the frame 69 is upturned to provide a support 70 for mounting six sensing pins 71. The position of the frame 69 is maintained through the instrumentality of a linkage including a link 72, which is pivotally connected to an intermediate lever 73 rotatively mounted on a shaft 74. The lever 73 is urged by a spring 76 to move in a counterclockwise direction, however, the free end of the lever 73 abuts against a detent 77 formed on an operating arm 78. Operating arm 78 is pivotally mounted on a stud 79 and has mounted thereon a roller 81 adapted to follow the periphery of a cam 82 fixed to the shaft 31.

Associated with the downwardly extending portion of the frame 69 is a contact element 86 adapted to be closed when the frame 69 pivots in a clockwise direction which only occurs when the sensing pins 71 ascertain a set of six apertures 13 in the tape 12. Closure of the contact 86 completes a circuit from battery 87 through the contact 86, over a lead 88, through a relay 89, and back to battery 87. A locking circuit for the relay 89 is completed by the closure of a contact 91 associated with the relay 89 and the closure of a contact 92 adapted to be controlled by a cam 93 mounted on the shaft 31. Energization of the relay 89 also draws up an armature contact 94 to condition a circuit which is completed upon closure of a contact 96 by a cam 97 mounted on the shaft 31. Closure of the contacts 94 and 96 completes a shunt circuit for a signaling line 98 connected to the commutator ring 44 which may be traced from ground, through the contact 96, over a lead 99, through the drawn up contact 94, over a lead 101 to the signaling line 98 which is connected to an outlying receiving station 102.

In normal operation of the apparatus, the tape 12 is advanced in one step increments by the pawl 18 and ratchet 17 to successively present transverse rows of permutations 13 to the sensing pins 64 and 71. As each transverse row of permutative apertures 13 is presented to the pins 64, the shaft 31 rotates the cam 29 to present a low portion of the cam to the follower 28. The cam follower 28 and the follower arm 26 thereupon pivot in a clockwise direction to withdraw the adjusting screw 24 from engagement with the arm 23. The bail 21 is thereafter permitted to pivot and as a consequence the sensing arms 59 are allowed to pivot under the influence of the tension springs 62. Pivoted movement of the sensing arms 59 is prevented whenever a nonperforated portion of the tape is positioned in register with an associated pin 64. Thus pins 64 which are in register with perforatons formed in the tape are permitted to move upwardly and probe the tape and pass therethrough thus allowing the associated sensing arm 59 to pivot in a counterclockwise direction. Counterclockwise movement of the arms 59 close the contact arms 57 positioned within the respective bifurcated sections of the arms 59 to pivot in a clockwise direction to engage the contacts 56. Closure of the contacts 56 connect ground through the conductive rod 58 through the respective contact arms 57, the engaged contacts 56, over the leads 54 to the respective segment 46 to 52. The segment 53 is connected by a lead 103 to the conductive shaft 58 so that at all times ground is applied to the segment 53. This segment 53 is representative of the stop impulse which accompanies each transmitted signal. The segment 46 is not connected to any ground or battery and hence is adapted to provide a no current or start impulse to precede each series of permutative impulses comprising a transmitted signal.

The timing of the operation of the brush 55 is such that the brush starts a cycle of rotation simultaneous with the positionment of the sensing arms 59; consequently, as the brush rotates and engages the segment 46, a no current or start impulse is impressed over the signaling line 98. The brush then continues its cycle of rotation by spanning the respective segments 47 to 52, inclusive, and manifestly those segments which are connected to ground by the movement of the contact arms 57 cause the completion of the transmitting circuits to impart current or marking impulses over the signaling line 98. Thus segments which are not connected to ground due to the sensing arms 59 being positioned by nonperforated portions of the tape 12 cause the impression of no current or space impulses on the signaling line 98.

Considering now the specific improvement, the rotation of the shaft 31 causes the cam 82 to present a high portion to the cam follower 81 (see Fig. 2), at a time subsequent to the operation of the cam 29, to pivot the operating arm 78 in a counterclockwise direction. Movement of the operating arm 78 tends to move the detent 77 from engagement with the intermediate lever 73 and as a consequence the extended tension spring 76 tends to pivot the intermediate lever 73 about the shaft 74. The force applied by the spring 76 is also imparted through the lever 73 to the link 72 and from there to the frame 69. The frame 69 is therefore urged in a clockwise direction to move the sensing pins 71 into engagement with the tape 12. If there are any nonperforated sections of the tape 12 in register with the pins 72 pivotal movement of the frame 71 is thereby prevented. In the situation where six perforations are in transverse alignment and in register with the pins 72, then the pins are moved up through the perforations in the tape. This situation will only occur when there are six perforations in the tape which are indicative of a rub-out or deletion signal.

Figure 2:
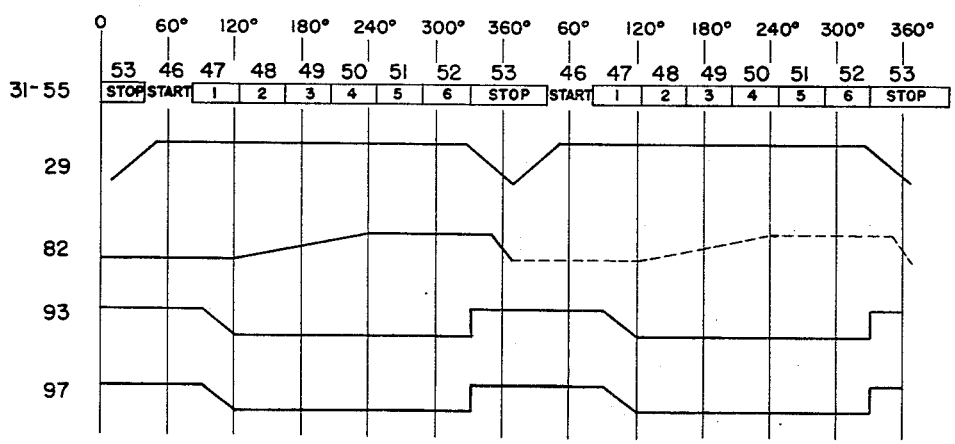
Fig. 2 is a timing diagram depicting the relationship between the various operating units during the transmission of a signal.

Clockwise movement of the frame 69 when a rub-out signal is sensed causes the contact 86 to close and as a consequence the previously traced circuit for the electromagnet 89 is completed. Energization of the electromagnet 89 draws up its armature 91 to condition a locking circuit for the electromagnet 89. Referring now to Figs. 1 and 2, it may be seen that the cam 93 presents a high portion to the contact 92 upon completion of transmission of the signal being sensed by the sensing pins 64 which occurs after the brush leaves the sixth segment 52. Closure of the contact 92, subsequent to the transmission of the signal being sensed by the sensing pins 64, completes the locking circuit for the electromagnet 89 and the locking circuit is maintained completed until the shaft 31 rotates a sufficient distance to cause the tape to be advanced one increment and the brush arm 55 to pass over the segment 46 and engage the segment 47. Energization of the electromagnet 89 also draws up the armature 94 to condition the shunt circuit for the signaling line 98. This shunt circuit is completed at the same time that the contact 92 is closed because the cam 97 (see Fig. 2) closes the contact 96 following passage of the brush 55 from the sixth segment 52. Closure of the contact 96 applies ground to the contact 96, over the lead 99, through the now drawn up armature 94, over the lead 101 to the signaling line 98 to hold the receiving magnets 102 energized during the period that the brush is spanning the start segment 46 of the commutator.

It is to be, therefore, appreciated that the shunt of the start segment 46 prevents the deenergization of the electromagnets 102 and as a consequence prevents the initiation of the receiving apparatus. As the brush 55 continues its rotation to span the segments 47 to 52, inclusive, continuous current is applied over the signal line 98 because the sensing pins 64 now sense the six perforations in the tape 12 which were previously sensed by the sensing pins 71 during the preceding cycle of operation. Inasmuch as the segment 53 is continuously connected to ground the net result is that there are no spacing impulses applied over the signaling line 98 during the rotation of the brush arm 55 and thus the receiving magnets 102 are not de-energized to initiate the operation of the receiving equipment during the cycle of rotation of the brush arm 55.

It will, therefore, be observed that no start impulse will be impressed over the signaling line 98 until such time as a permutation of perforations 13 containing less than six perforations is presented to the sensing pins 71. Upon such a non rub-out permutation being presented to the sensing pins 71, the frame 69 is thereby prevented from pivoting to close a contact 86 and since the locking circuit for the electromagnet 89 opens during each cycle of rotation of the shaft 31, the electromagnet is no longer maintained in an energized condition. De-energization of the electromagnet 89 releases the armature 94; thus, the shunt circuit cannot be completed by the cyclic closure of the contact 96 and the apparatus is now in condition to continue the normal transmission of intelligence signals over the signaling line 98.

Figure 3:
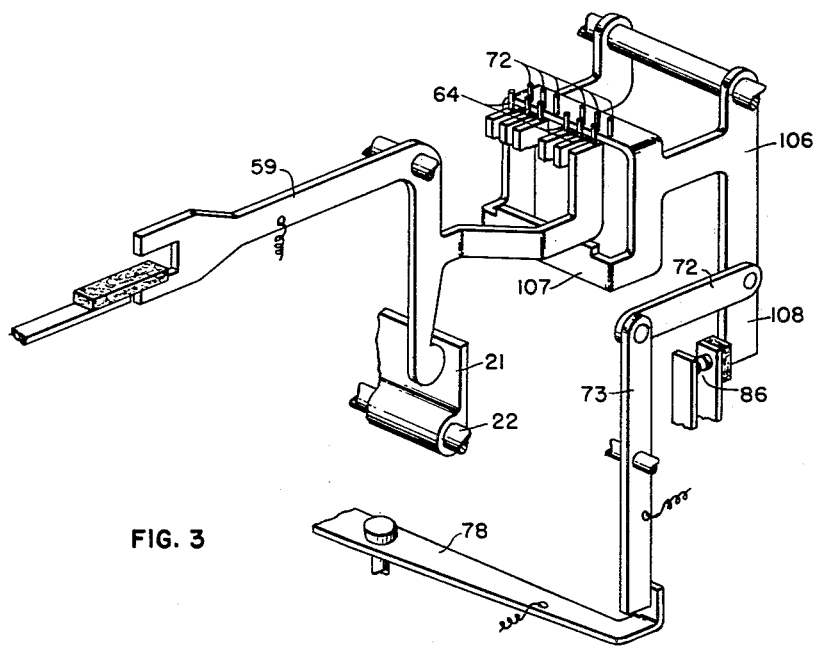
Fig. 3 is a side elevational view of a modified form of the invention.

Referring now to Fig. 3 there is shown an alternate embodiment of the invention which is designed to prevent the transmission of a rub-out or deletion signal only upon the occurrence of two or more successive series of six permutations contained in the tape 12. This is accomplished by having a special frame 106 provided with an extension 107 to underly the sensing arms 59. The frame 106 is provided with an extension 108 to engage the contact 86 in a manner substantially identical with that described with relation to the apparatus shown in Fig. 1. In the present situation, however, it is necessary that all six sensing levers 59 be moved in a counterclockwise direction before the frame 106 can move into position to sense the permutations in the tape 12.

When the pins 64 ascertain six perforations in register therewith and the pins 71 ascertain six perforations in register therewith, then the frame 106 is permitted to pivot to close the contact 86. The result of the closure of the contact 86 is to cause the completion of the shunt circuit for the signal line 98 in a manner identical with that described in regard to the embodiment of the invention shown in Fig. 1. The shunt circuit is interrupted whenever the sensing pins 71 do not ascertain a transverse row of permutations in the tape 12 and when this occurs then subsequent operation of the transmitter is in accordance with the permutations of perforations contained in the tape. The advantage of this embodiment of the invention is that a first rub-out or deletion signal or a single rub-out in the tape is permitted to be transmitted to indicate a space.

It is to be understood that the above-described arrangements of apparatus and circuits and the construction of the elemental parts are simply illustrative of the applications of the invention and many other modifications may be made without departing from the invention.

What is claimed is:

1. In a telegraph transmitter comprising a commutator connected to a signaling line, means for sensing permutatively apertured tape, means for applying the readings of the sensing means to the commutator to control the application of signals to the signaling line, a second sensing means for sensing the apertures in the tape, a circuit including a relay and a pair of contacts, means controlled by the sensing means and the transmitter for closing the contacts, a shunt circuit connected to the signaling line, a pair of normally open contacts included in the shunt circuit, means controlled by the transmitter and the energization of the relay for completing the shunt circuit.

2. In a telegraph transmitter, means for controlling the generation of signals by the transmitter in conformity with permutatively arranged indicia on a control form, a signaling line connected to the transmitter, means for sensing the indicia in the control form, a circuit including an electromagnet completed by the sensing means perceiving a predetermined permutation of indicia in the control form, a locking circuit, means operative in conjunction with the sensing means for completing the locking circuit, a shunt circuit for the signaling line having two normally open contacts therein, and means controlled by the transmitter for cyclically closing one of said shunt contacts, said other of the shunt contacts being closed by the energization of the electromagnet.

3. In a telegraph transmitter having a segmented distributor, said segments comprising a start segment plus a plurality of signal segments, a commutator, a signaling line connected to the commutator, a brush spanning the segments and the commutator, means for cyclically rotating the brush to successively span the segments with the commutator, elements adapted to be permutatively positioned in accordance with permutative apertures in a tape, means controlled by the rotating means to cyclically permit the elements to be permutatively positioned, means connecting each positionable means with one segment, a shunt circuit having two normally open contacts therein, means for cyclically closing one of said contacts each time the brush spans the start segment, auxiliary means for sensing the tape, and means actuated by the auxiliary sensing means sensing a predetermined permutation of apertures in the tape for closing the other contact thereby shunting the start segment during the period the brushes are spanning the commutator and start segment.

4. In a rotary segmental commutator type telegraph transmitter having one of said segments representative of a start impulse, a brush spanning the segments, means for rotating the brush to cyclically move the brush over the respective segments, a sensing device for perceiving permutation of apertures in a message tape, means controlled by the sensing device for controlling the output of the distributor, a second sensing device for perceiving the permutations of apertures in the message tape, a shunt circuit for the start segments, a pair of normally open contacts in the shunt circuit, and means operated by the cojoint operation of the rotating means and the second sensing device for closing the contacts in the shunt circuit following perception of a predetermined permutation of apertures in the message tape.

5. In a telegraph transmitter, a segmental distributor, a commutator connected to a signaling line, a brush spanning the segmented distributor and the commutator, a shaft connected to the brush, means for rotating the shaft, a sensing device adapted to complete circuits to the distributor in accordance with permutative indicia in the tape, a circuit including a relay adapted to be energized upon the second device sensing a predetermined permutation of indicia in the tape, a cam on the shaft adapted to complete a locking circuit for the relay, a shunt circuit for the signaling line, a pair of normally open contacts in the shunt circuit, and a cam on the shaft adapted to cyclically close one of said shunt contacts, said other contact adapted to be closed by the relay.

6. In a telegraph transmitter, a first sensing device for controlling the generation of signals by the transmitter in accordance with permutations of apertures in a message tape, a second sensing device adapted to sense the permutations of apertures, second sensing means adapted to sense a second permutation of apertures while said first sensing means is sensing a first permutation of apertures, and means operative when both sensing devices sense an identical predetermined permutation of apertures for precluding the generation of signals.

7. In a tape controlled transmitter, means for generating signals, means for sensing permutations of indicia in the tape and controlling the signal generating means, auxiliary means for sensing the permutations of indicia, said auxiliary sensing means adapted to sense a second permutation of indicia while said first mentioned sensing means is sensing a first permutation of indicia, and means under the joint control of both sensing means for effecting disablement of the signal generating means.

8. In a telegraph transmitter, a first means for sensing contiguous sets of permutations of apertures in a control form, means actuated by the first sensing means for controlling the generation of signals by the transmitter in accordance with each set of permutative apertures, a second means for sensing each set of permutative apertures, means for advancing the control form past both sensing means, said first sensing means adapted to sense a first set of apertures while said second sensing means is sensing a second set of apertures, and means controlled by the simultaneous sensing by both sensing means of identical predetermined sets of permutative apertures for rendering ineffective the generation of a signal in response to the first means sensing the second one of the predetermined sets of permutative apertures.

9. In a telegraph transmitter having a signaling channel connected thereto, a first means adapted to sense and be positioned by successive sets of permutative apertures formed in a tape, means actuated by the positionment of the first means for controlling the signals generated by the transmitter, a second means for simultaneously sensing each set of permutative apertures and the positions assumed by the first means, means for advancing the tape past both sensing means, said first sensing means adapted to sense a first set of permutative apertures while said second sensing means is sensing a second set of apertures, a shunt circuit for the transmitter connected to the signaling line, a normally open contact in the shunt circuit, and means operated by the second means sensing a predetermined positionment of the first means and a predetermined set of apertures in the tape for closing the contact.

10. In a telegraph transmitter having a distributor adapted to generate a start impulse preceding each signal, a first means for sensing permutatively apertured tape, means controlled by the first means for determining the character of the signal generated by the distributor, a second means for sensing the permutatively apertured tape, means for precluding the generation of a start impulse, a relay energized by the second means sensing a predetermined permutation of apertures for operating the means for precluding the generation of a start impulse and means for holding said relay energized during the period in which the start impulse is normally generated.

11. In a telegraph transmitter, a distributor having a plurality of segments, one of said segments being representative of a start pulse, a commutator, means cyclically spanning the segments and the commutator to generate a start pulse plus a plurality of intelligence pulses, a signaling line connected to the commutator, a first means for sensing a preform to control the energization of the segments, a second means for sensing the preform, a shunt circuit connected to the signaling line, a first normally open contact included within the shunt circuit, means controlled by the second means sensing a predetermined indicia in the preform for closing the first contact, a second normally open contact included within the shunt circuit, and means cyclically operable to close the second contact during the period that the spanning means spans the start segment.

References Cited in the file of this patent

UNITED STATES PATENTS

| | | |
|---|---|---|
| 1,863,479 | Hoover et al. | June 14, 1932 |
| 2,296,845 | Goetz | Sept. 29, 1942 |
| 2,477,309 | Maxwell | July 26, 1949 |